US009235607B1

(12) United States Patent
Ross et al.

(10) Patent No.: US 9,235,607 B1
(45) Date of Patent: Jan. 12, 2016

(54) SPECIFYING A PREDETERMINED DEGREE OF INCONSISTENCY FOR TEST DATA

(71) Applicant: Google Inc., Mountain View, CA (US)

(72) Inventors: Max C. Ross, Sunnyvale, CA (US); Alfred R. K. Fuller, San Carlos, CA (US)

(73) Assignee: GOOGLE INC., Mountain View, CA (US)

( * ) Notice: Subject to any disclaimer, the term of this patent is extended or adjusted under 35 U.S.C. 154(b) by 259 days.

(21) Appl. No.: 13/853,985

(22) Filed: Mar. 29, 2013

Related U.S. Application Data

(60) Provisional application No. 61/617,630, filed on Mar. 29, 2012.

(51) Int. Cl.
*G06F 17/30* (2006.01)

(52) U.S. Cl.
CPC .............................. *G06F 17/30303* (2013.01)

(58) Field of Classification Search
CPC ................................................ G06F 17/30303
USPC ....................................................... 707/690
See application file for complete search history.

(56) References Cited

U.S. PATENT DOCUMENTS

| | | | |
|---|---|---|---|
| 4,325,120 A | 4/1982 | Colley et al. |
| 4,779,194 A | 10/1988 | Jennings et al. |
| 4,796,178 A | 1/1989 | Jennings et al. |
| 5,325,522 A | 6/1994 | Vaughn |
| 5,381,546 A | 1/1995 | Servi et al. |
| 5,560,007 A | 9/1996 | Thai |
| 5,745,890 A | 4/1998 | Burrows |
| 6,105,019 A | 8/2000 | Burrows |
| 6,108,748 A | 8/2000 | Ofek et al. |
| 6,269,382 B1 | 7/2001 | Cabrera et al. |
| 6,289,334 B1 | 9/2001 | Reiner et al. |
| 6,341,302 B1 | 1/2002 | Celis |
| 6,370,539 B1 | 4/2002 | Ashby et al. |
| 6,963,869 B2 | 11/2005 | Burrows |
| 7,043,469 B2 | 5/2006 | Goralwalla et al. |
| 7,058,949 B1 | 6/2006 | Willen et al. |

(Continued)

OTHER PUBLICATIONS

Rush et al., "Maximizing Detection of Data Inconsistency: The Development of a Consistency Check Interpreter", 1987, pp. 848-851.*

(Continued)

*Primary Examiner* — Apu Mofiz
*Assistant Examiner* — Jared Bibbee
(74) *Attorney, Agent, or Firm* — Morgan, Lewis & Bockius LLP

(57) ABSTRACT

A method and a test system for specifying a predetermined degree of inconsistency for test data are disclosed. The test system obtains a test policy, which specifies a predetermined degree of inconsistency between write operations and subsequent read operations on a set of data and subsequently receives a request to provide test data to an application. In response to the request to provide test data to the application the test system generates a set of test data including a plurality of entities retrieved from the set of data, based at least in part on the test policy. The test data includes a respective entity that is not consistent with a previous write operation. The test system further provides the set of test data to the application. The application optionally processes the set of test data to produce results, which are used to determine performance of the application.

18 Claims, 11 Drawing Sheets

(56) References Cited

U.S. PATENT DOCUMENTS

| | | |
|---|---|---|
| 7,155,716 B2 | 12/2006 | Hooman et al. |
| 7,243,351 B2 | 7/2007 | Kundu |
| 7,246,353 B2 | 7/2007 | Forin et al. |
| 7,406,460 B2 | 7/2008 | Burrows |
| 7,467,163 B1 | 12/2008 | Dodds et al. |
| 7,516,456 B2 | 4/2009 | Aguilar, Jr. et al. |
| 7,689,550 B2 | 3/2010 | Lee et al. |
| 7,801,864 B2 | 9/2010 | Prahlad et al. |
| 8,099,422 B2 | 1/2012 | De Bellis |
| 8,131,680 B2 | 3/2012 | Prahlad et al. |
| 8,185,899 B2 | 5/2012 | Daly et al. |
| 8,392,408 B1 | 3/2013 | Fuller |
| 8,468,167 B2 * | 6/2013 | Sathyanarayana et al. ... 707/776 |
| 8,560,509 B2 | 10/2013 | Xia et al. |
| 8,635,621 B2 | 1/2014 | Levitan et al. |
| 2003/0088715 A1 | 5/2003 | Chaudhuri et al. |
| 2003/0140035 A1 | 7/2003 | Burrows |
| 2004/0030970 A1 * | 2/2004 | Chen et al. ............ 714/718 |
| 2004/0167873 A1 | 8/2004 | Dettinger et al. |
| 2004/0167904 A1 | 8/2004 | Wen et al. |
| 2004/0243569 A1 | 12/2004 | Burrows |
| 2005/0055355 A1 | 3/2005 | Murthy et al. |
| 2005/0228792 A1 | 10/2005 | Chandrasekaran et al. |
| 2006/0010426 A1 * | 1/2006 | Lewis et al. ............ 717/124 |
| 2006/0028488 A1 | 2/2006 | Gabay et al. |
| 2006/0031811 A1 | 2/2006 | Ernst et al. |
| 2006/0235730 A1 | 10/2006 | Politano et al. |
| 2006/0235731 A1 | 10/2006 | Gupta et al. |
| 2006/0235737 A1 | 10/2006 | Fleurant et al. |
| 2006/0271556 A1 | 11/2006 | Mukherjee et al. |
| 2008/0059080 A1 * | 3/2008 | Greiner et al. ............ 702/33 |
| 2008/0082345 A1 * | 4/2008 | Greiner et al. ............ 705/1 |
| 2009/0198779 A1 | 8/2009 | Agrawal et al. |
| 2010/0023502 A1 | 1/2010 | Marlow |
| 2010/0042602 A1 | 2/2010 | Smyros et al. |
| 2010/0082652 A1 | 4/2010 | Jones et al. |
| 2010/0281061 A1 * | 11/2010 | Chen ............ 707/794 |
| 2011/0066602 A1 * | 3/2011 | Studer et al. ............ 707/690 |
| 2011/0119249 A1 | 5/2011 | Flatz et al. |
| 2011/0137888 A1 | 6/2011 | Yoo et al. |
| 2011/0153575 A1 * | 6/2011 | Glasser et al. ............ 707/690 |
| 2011/0225167 A1 | 9/2011 | Bhattacharjee et al. |
| 2011/0238654 A1 | 9/2011 | Allen et al. |
| 2011/0246498 A1 | 10/2011 | Forster |
| 2011/0295815 A1 * | 12/2011 | Mandagere et al. ........ 707/690 |
| 2012/0117105 A1 | 5/2012 | Thomas et al. |
| 2012/0150820 A1 * | 6/2012 | Sankaranarayanan et al. ............ 707/690 |
| 2012/0197928 A1 | 8/2012 | Zhang et al. |
| 2012/0330954 A1 | 12/2012 | Sivasubramanian et al. |
| 2013/0018867 A1 | 1/2013 | Regan et al. |
| 2013/0097599 A1 | 4/2013 | Konik et al. |
| 2013/0097608 A1 | 4/2013 | Kessler et al. |
| 2013/0282765 A1 | 10/2013 | Bhattacharjee et al. |

OTHER PUBLICATIONS

Ben-Gan, Descending Indexes, Index Ordering, Parallelism, and Ranking Calculations, SQL Server Pro, May 24, 2010, 7 pgs.

Decipherinfosys, Column Order in a Composite Index, Systems Engineering and RDBMS, May 13, 2008, 4 pgs.

Quassnoi, Explain Extended, Descending Indexes, Apr. 27, 2009, 8 pgs.

Scharlock, Designing Composite Indexes, Sep. 26, 2008, 5 pgs.

PostgreSQL, PostgreSQL 8.1.3 Documentation, Internet Archive Wayback Machine, May 4, 2006, 1 page.

* cited by examiner

Entity Value Changes Over Time

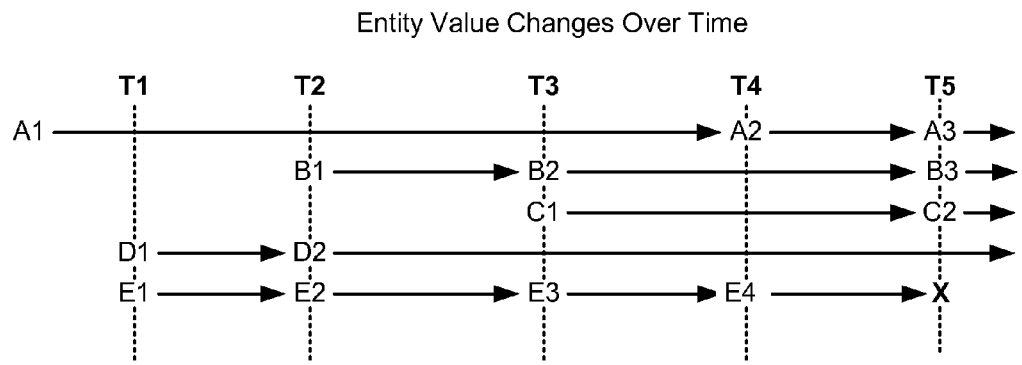

Figure 6A

Simulated Transaction Log
126

| Operation | Relevant Entity | Timestamp | 50% | 75% | 100% |
|---|---|---|---|---|---|
| Create | Entity D, D1 | T1 | x | x | x |
| Create | Entity E, E1 | T1 | x | x | x |
| Create | Entity B, B1 | T2 | x | x | x |
| Modify | Entity D, D2 | T2 |  |  | x |
| Modify | Entity E, E2 | T2 |  | x | x |
| Modify | Entity B, B2 | T3 |  | x | x |
| Create | Entity C, C1 | T3 | x | x | x |
| Modify | Entity E, E3 | T3 | x |  | x |
| Modify | Entity E, E4 | T4 |  |  | x |
| Modify | Entity A, A2 | T4 | x | x | x |
| Delete | Entity E | T5 |  | x | x |
| Modify | Entity A, A3 | T5 |  | x | x |
| Modify | Entity B, B3 | T5 |  | x | x |
| Modify | Entity C, C2 | T5 | x |  | x |

602
604
606 x = operations applied

Figure 6B

| Age Range | Percentage of Operations Applied |
|---|---|
| age ≥ 5ms | 99% |
| 5ms > age ≥ 2ms | 75% |
| age < 1ms | 50% |

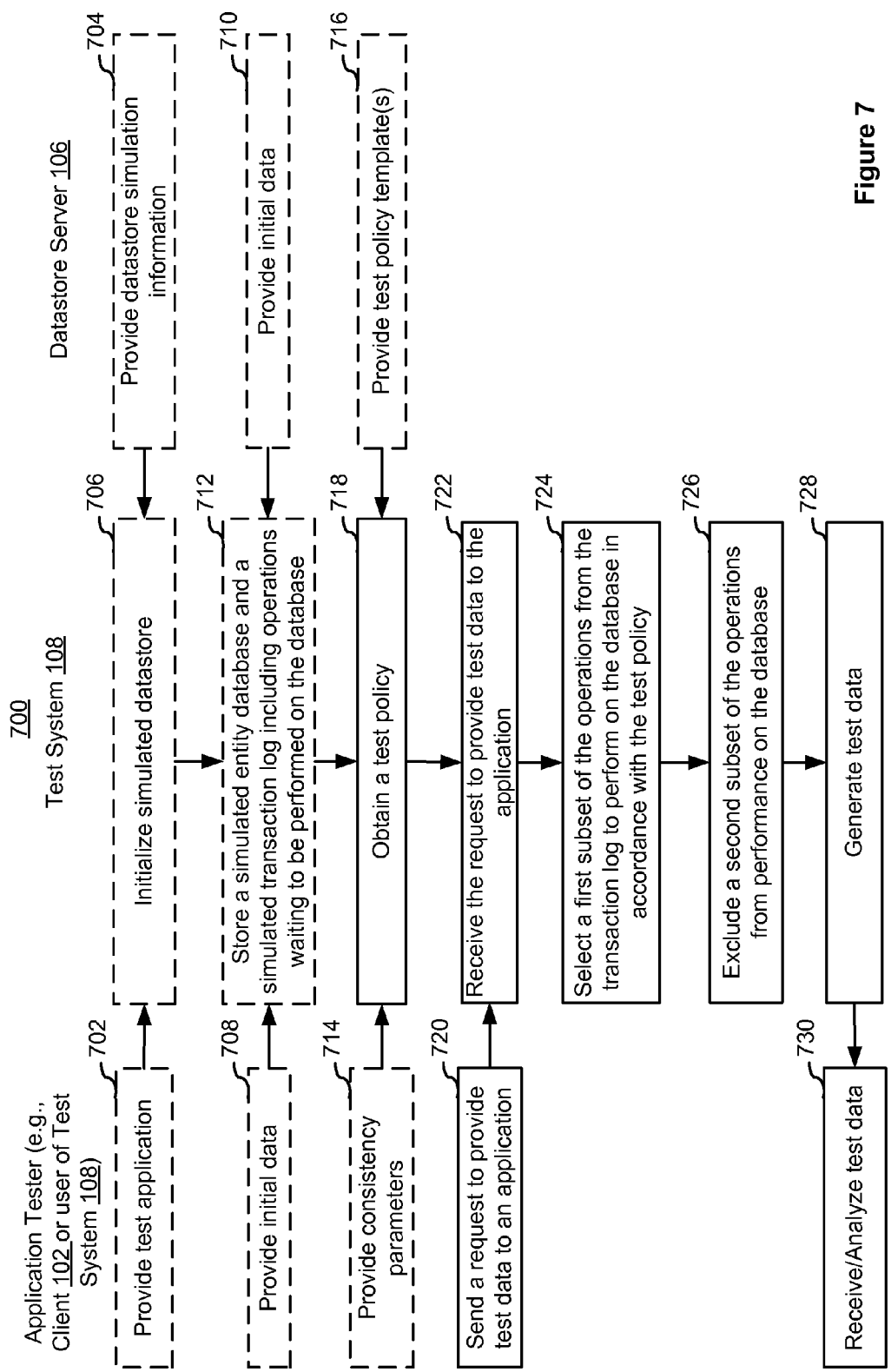

SPECIFYING A PREDETERMINED DEGREE OF INCONSISTENCY FOR TEST DATA

RELATED APPLICATIONS

This application claims priority to U.S. Provisional Patent Application No. 61/617,630, filed Mar. 29, 2012, entitled "Specifying a Predetermined Degree of Inconsistency for Test Data" which is incorporated herein by reference in its entirety.

SUMMARY

The disclosed embodiments relate generally to testing computer applications, and in particular, to a system and method for generating test data that simulates a high-replication datastore. Every day, in a large-scale database system, millions of data operations are carried out in response to user queries. In particular, data modifying operations, such as update, add or remove operations, result in changes to entities stored in a database. In some situations, to conserve system resources, not all data modifying operations are immediately applied when received. However in a high-replication datastore it can be very costly to ensure that read data is consistent with data modifying operations that have been performed on data in the datastore. As such, inconsistencies frequently arise in such datastores, where read data does not reflect all of the data modification operations that were received prior to a corresponding read request. Thus, applications that retrieve data from high-replication datastores are faced with the likelihood of receiving inconsistent data.

Providing an application with inconsistent data can cause many different types of problems, including providing inaccurate data to end users and crashing the application. As such, it is beneficial for application programmers to be able to test applications and in particular to test how applications behave when they receive inconsistent data (e.g., data that looks valid but is actually out-of-date due to some data modification having not yet been applied). In some cases randomly generated test data is used to test applications (e.g. a random string of ones and zeros). However, this approach does not provide a realistic test for how the application handles inconsistency in data, because the randomly generated test data will generally not even appear to be valid data. It would therefore be advantageous to provide a system and method that provides test data including inconsistencies similar to those produced by a high-replication datastore (e.g., by generating test data that has a predetermined degree of inconsistency).

In some embodiments, a method is performed at a computer system having one or more processors and memory storing one or more programs for execution by the one or more processors so as to perform the method. The method includes obtaining a test policy, which specifies a predetermined degree of inconsistency between write operations and subsequent read operations on a set of data. The method further includes receiving a request to provide test data to an application and, in response to the request to provide test data to the application, generating a set of test data including a plurality of entities retrieved from the set of data, based at least in part on the test policy. The test data includes a respective entity that is not consistent with a previous write operation. The method also includes providing the set of test data to the application.

In accordance with some embodiments, a computer system (e.g., a client system, a server system or a test system) includes one or more processors, memory, and one or more programs. The one or more programs are stored in memory and configured to be executed by the one or more processors and the one or more programs include instructions for performing the operations of the method described above. In accordance with some embodiments, a non-transitory computer readable storage medium has stored therein instructions which, when executed by one or more processors, cause a computer system (e.g., a client system, a server system or a test system) to perform the operations of the methods described above.

BRIEF DESCRIPTION OF THE DRAWINGS

For a better understanding of the disclosed embodiments, reference should be made to Description of Embodiments below, in conjunction with the following drawings, in which like reference numerals refer to corresponding parts throughout the figures.

FIG. 6A is a block diagram illustrating changes to values of entities over time, in accordance with some embodiments.

FIG. 6B is a block diagram illustrating a simulated transaction log, in accordance with some embodiments.

FIG. 7 includes a flow chart illustrating a method for testing an application, in accordance with some embodiments.

DESCRIPTION OF EMBODIMENTS

It will be understood that, although the terms "first," "second," etc. may be used herein to describe various elements, these elements should not be limited by these terms. These terms are only used to distinguish one element from another. For example, a first entity could be termed a second entity, and, similarly, a second entity could be termed a first entity, without changing the meaning of the description, so long as all occurrences of the "first entity" are renamed consistently and all occurrences of the "second entity" are renamed consistently. The first entity and the second entity are both entities, but they are not the same entity.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Some embodiments described below include client and server systems, which, in some embodiments, inter-operate in a distributed client-server system and corresponding methods of specifying a predetermined degree of inconsistency for test data so as to test applications efficiently and effectively. Alternatively, a computer system that includes a test application and a simulated datastore is enabled to test the test application using the simulated datastore.

Figure 1:
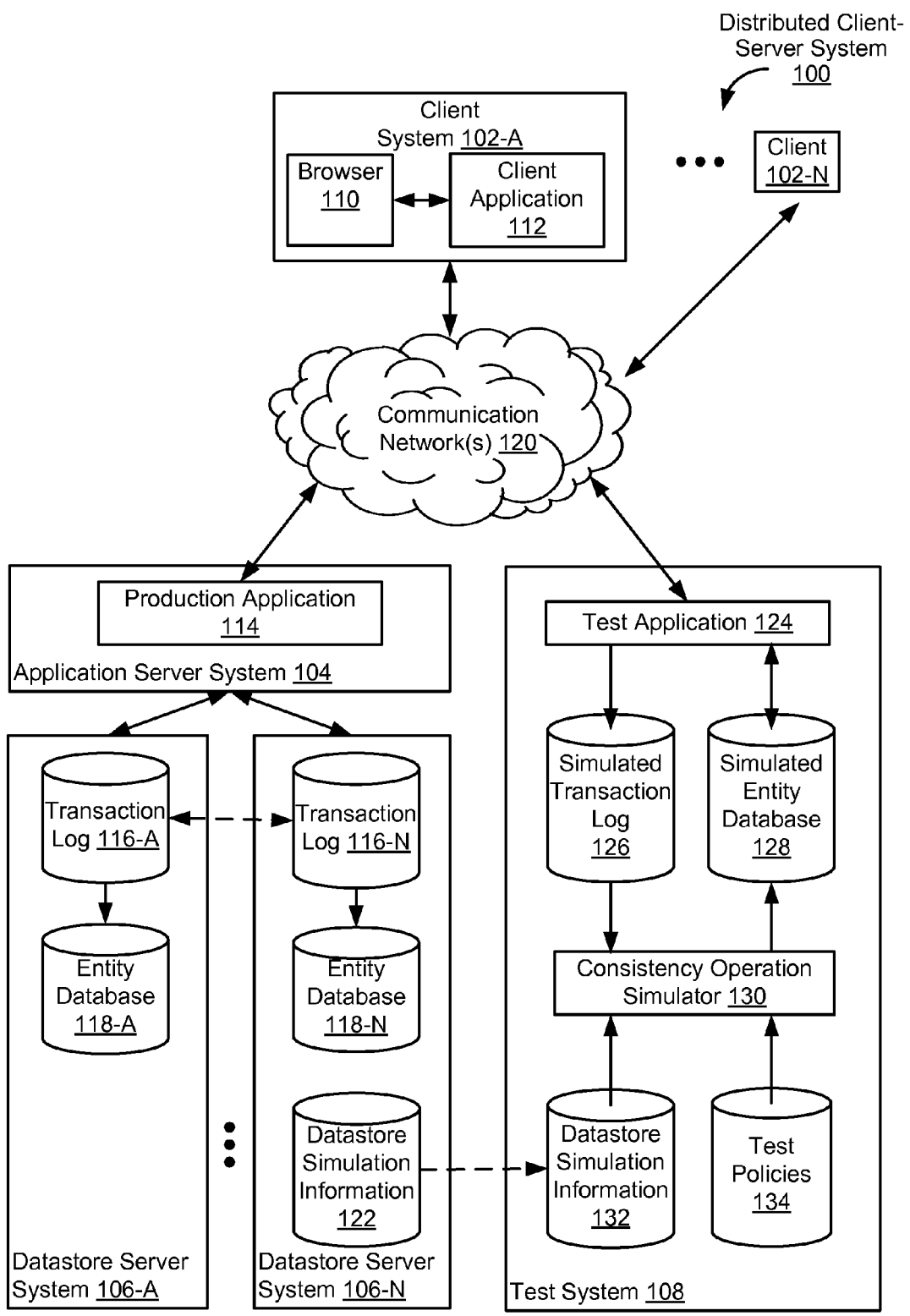
FIG. 1 is a block diagram illustrating a distributed client-server system, in accordance with some embodiments.

FIG. 1 includes a block diagram illustrating an example Distributed Client-Server System 100. Distributed Client-Server System 100 includes one or more Client System(s) 102 (a representative of which is referred to herein as "Client 102"), Application Server System 104 ("Application Server 104"), one or more Datastore Server System(s) 106-A . . . 106-N (a representative of which is referred to herein as "Datastore Server 106"), Test System 108 ("Test System 108"), and Communication Network 120 for connecting Client(s) 102 to Application Server 104, and Test System 108. In some embodiments, Communication Network 120 includes the Internet, one or more local area networks (LANs), one or more wide area networks (WANs), other types of networks, or a combination of such networks.

Distributed Client-Server System 100, as shown in FIG. 1, includes a high-replication datastore (e.g., Datastore Servers 106 in FIG. 1). Distributed Client-Server System 100, as shown in FIG. 1, also includes Test System 108 for simulating operation of the high-replication datastore for the purposes of testing applications that are to interact with the high-replication datastore. In some embodiments, Test System 108 is a component of Client 102. In other embodiments, Test System 108 is accessed by Client 102 via Communications Network 120. Generally, at a particular point in time, a respective application at Client 102 will only interact with either the high-replication datastore (e.g., while using a production version of the respective application) or with Test System 108 (e.g., while testing the respective application).

In some embodiments, while interacting with the high-replication datastore, Client 102 optionally includes Browser 110 and/or Search Application 112. Browser 110 can be a general purpose Internet browser (sometimes called a Web browser) having a browser window used for displaying a query entry interface and query results. A web application user interface is optionally implemented using hypertext markup language (HTML) or extensible markup language (XML) elements that are rendered by Browser 110. Alternatively, a query is, optionally, submitted via a standalone Client Application 112. After a user submits a request for representations of entities matching a query through Browser 110 or a stand-alone Client Application 112, Client 102 relays the request to Application Server 104 via Communication Network 120. Application Server 104 (or Production Application 114) communicates with the high-replication datastore (e.g., Datastore Servers 106 in FIG. 1) to identify a plurality of matching entities and transfers search results including representations of the matching entities and, optionally, a set of display information back to Client 102. Client Application 112 and/or Browser 110 uses the search results and display information to render a set of search results at Client 102.

In some embodiments, the respective Datastore Servers 106 include Frontend Server, Query Planner, Query Engine, Result Filter, Entity Database 118, one or more Indexes, Transaction Log 116, Consistency Operation Module and, optionally, Datastore Simulation Information 122. Transaction Log 116 records data operations that have been requested and, optionally, acknowledged but not yet applied to entities stored in Entity Database 118. Database Simulation Information 122 includes information on how to simulate Datastore Server 106, and in particular, Entity Database 118, in a testing environment, for example, in Test System 108.

The Frontend Server of Datastore Server 106 relays a client query received from Application Server 104 to the Query Planner and, after the client query is executed, relays query results from the Result Filter back to Application Server 104 for delivery to Client 102. The Query Planner generates one or more queries based on syntax of the client query, logical relationships between database entities relevant to the client query, and/or other criteria, and transmits the one or more queries to the Query Engine. The Query Engine executes the one or more queries to retrieve entities matching the one or more queries from Entity Database 118. In some embodiments, the Query Engine identifies entities matching the one or more queries using one or more entity indexes. In some embodiments, the one or more queries are not executed until the Consistency Operation Module has applied one or more write operations recorded in Transaction Log 116 to Entity Database 118. After the one or more queries are executed, query results are transmitted from the Query Engine to the Result Filter, where they are filtered and further transmitted to Frontend Server, and then to Client 102. In some embodiments Transaction Logs 116 are replicated across multiple Datastore Systems 106 (e.g., Transaction Log 116-A and Transaction Log 116-N in FIG. 1) and the replication of Transaction Logs 116 keeps the replicas of Entity Database 118 synchronized (due to application of the transactions in each Transaction Log 116 to the corresponding Entity Database 118).

In some embodiments, where there are multiple server systems (e.g., Server System 118-A and Server System 118-N) that include replicas of Entity Database 140 (e.g., Entity Database 104-A and Entity Database 140-N), the Backend Process communicates with the multiple server systems to synchronize entity changes between replicas of Entity Database 118. In some embodiments, the Backend Process is a background process that scans a set of databases (e.g., the Entity Database replicas) for rows of the databases that need to be synced. In some implementations, where multiple replicas of a database are stored in multiple Servers 106, when a data operation is performed, Servers 106 attempt to perform the data operation on all replicas of the database. If the attempt to perform the write operation on all replicas of the database fails, the entity is marked as needing to be synced, and the Backend Process eventually identifies this entity as needing to be synced (e.g., during a scan of the databases) and performs a sync operation to synchronize the entity across the replicas of the database. While there are rows that need to be synced, an application may retrieve inconsistent data, as some entities not up to date on at least some of the replicas of the database.

In some embodiments, when interacting with Test System 108, Client 102 includes Browser 110 and/or Client Application 112. In some embodiments, Browser 110 is a general purpose Internet browser (sometimes called a Web browser) having a browser window used for receiving user input, for example, receiving a consistency parameter from a user, and for displaying test results. In some embodiments, a web application user interface is implemented using hypertext markup language (HTML) or extensible markup language (XML) elements that are rendered by Browser 110. Alternatively, the consistency parameter or a request for providing test data is submitted via standalone Client Application 112. After a user submits the consistency parameter or the request for providing test data through Browser 110 or stand-alone Client Application 112, Client 102 relays the parameter and/or request to Test System 108 via Communication Network 120. Test System 108 then generates test data that includes a predetermined degree of data inconsistency, and provides the test data to Test Application 124 that is being tested. Test Application 124 generates test results based on the test data. Test System 108, in some embodiments, also analyzes the test results to determine performance of Test Application 124. Client Application 112 and/or Browser 110, in some embodiments, display the test results and the analysis thereof at Client 102.

In some embodiments, Test System 108 includes Test Application 124, Simulated Transaction Log 126, Simulated Entity Database 128, Consistency Operation Simulator 130, Datastore Simulation Information 132, and Test Policies 134. In some embodiments, Test Application 124 includes a subroutine of Production Application 114 that is being tested. In other embodiments, Test Application 124 includes a testing version (e.g., a replica for testing purpose) of Production Application 114. In some embodiments, Datastore Server 106 exchanges data with Test System 108. For example, Test System 108 retrieves Datastore Simulation Information 132 based on Datastore Simulation Information 122 stored at Datastore Server 106. Datastore Simulation Information 132 enables Test System 108 to generate or store Simulated Transaction Log 126, Simulated Entity Database 128, Consistency Operation Simulator 130 and, optionally, Test Policies 134. In other words, Test System 108 downloads a "testing harness" from Datastore Server 106, which is used to test applications (e.g., Test Application 124) by simulating operation of Datastore Server 106.

In some embodiments, Test Application 124 is stored at Client 102 and communicates with Test System 108 and Simulated Entity Database 128, via Communication Network(s) 120. In other embodiments, Test Application 124 is stored at a same computer system (e.g., Test System 108) as Simulated Entity Database 128. Simulated Transaction Log 126 includes data operations requested but not yet applied to Simulated Entity Database 128. In some embodiments, Simulated Transaction Log 126 includes data operations recorded in Transaction Log 116, or a subset thereof. In many situations, Simulated Transaction Log 126 has a much smaller storage capacity than Transaction Log 116 and thus includes records of a subset of the data operations that recorded by in Transaction Log 116. In other embodiments, Simulated Transaction Log 126 includes data operations in addition to those included in Transaction Log 116. Simulated Entity Database 128 includes entities and information about entities. In some embodiments, Simulated Entity Database 128 includes a testing version of Entity Database 118, or a subset thereof. In many situations, Simulated Entity Database 128 has a much smaller storage capacity than Entity Database 118 and thus stores a subset of the entities that are stored in Entity Database 118. In some embodiments, Simulated Entity Database 128 includes entities different from those included in Entity Database 118. In other words, in some embodiments, test data provided by an application tester does not correspond to production data stored in Datastore Servers 106.

In some embodiments, Consistency Operation Simulator 130 selectively applies data operations recorded in Simulated Transaction Log 126 to Simulated Entity Database 128. In some embodiments, Datastore Simulation Information 132 includes information enabling Test System 108 to simulate inconsistencies in retrieved data and, optionally data and data modification operations for storage in Simulated Entity Database 128 and Simulated Transaction Log 126, received from Datastore Simulation Information 122. Datastore Simulation Information 132 is used by Test System 108 to simulate data inconsistency that is similar to data inconsistency that would be experienced by an application receiving data from the high-replication datastore (e.g., Datastore Servers 106).

Figure 2:
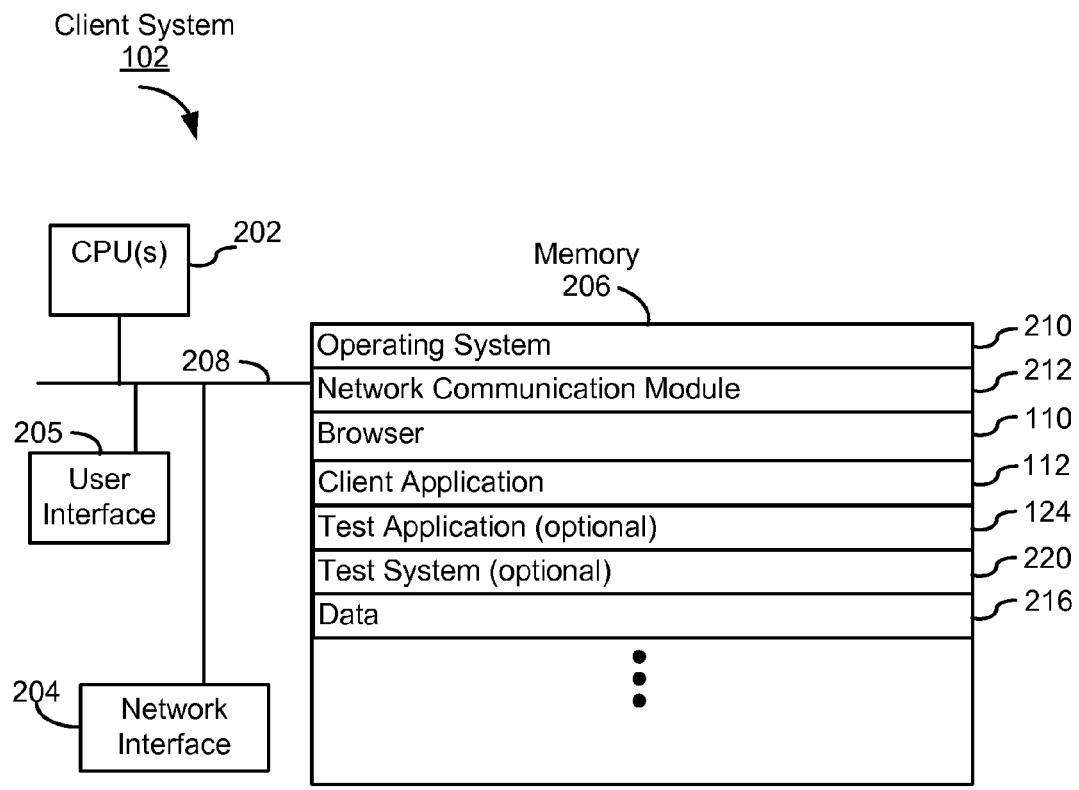
FIG. 2 is a block diagram illustrating a client system, in accordance with some embodiments.

FIG. 2 is a block diagram illustrating Client System 102 (also referred to herein as "Client 102") in accordance with some embodiments. Client 102, in some embodiments, includes one or more processing units CPU(s) 202 (also herein called processors), one or more Network Interfaces 204, Memory 206, User Interface 205 which, in some embodiments, includes a display device and a keyboard, mouse, touchpad, touchscreen or other input device, and one or more Communication Buses 208 for interconnecting these components. Communication Buses 208, in some embodiments, include circuitry (sometimes called a chipset) that interconnects and controls communications between system components. Memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally includes one or more storage devices remotely located from the CPU(s) 202. Memory 206, or alternatively the non-volatile memory device(s) within Memory 206, comprises a non-transitory computer readable storage medium. In some embodiments, Memory 206 or alternatively the non-transitory computer readable storage medium stores the following programs, modules and data structures, or a subset thereof:

Operating System 210 which includes procedures for handling various basic system services and for performing hardware dependent tasks;

Network Communication Module (or instructions) 212 for connecting Client 102 to other computers (e.g., Application Server 104 and Test System 108) via one or more Network Interfaces 204 (wired or wireless) and one or more Communication Networks 120 (FIG. 1), such as the Internet, other wide area networks, local area networks, metropolitan area networks, and so on;

Browser 110 for loading web pages, which optionally include code for executing Client Application 112 as an embedded application;

Client Application 112 (e.g., a stand-alone client) for transmitting information and user requests to Application Server 104 and Test System 108, and optionally displaying test results received from Test System 108;

optionally, Test Application 124 for receiving and processing test data;

optionally, Test System 220 (e.g., a testing harness including one or more of the components of Test System 108)

for generating test data, providing test data to Test Application 124, collecting test results, and optionally analyzing the test results; and optionally, Data 216 includes cached data (e.g., recently generated test data, recent user input, recent test results, queries, query results, etc.) corresponding to one or more prior user inputs.

In some implementations, each of the above identified elements is stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 206 optionally stores a subset of the modules and data structures identified above. Furthermore, Memory 206 may store additional modules and data structures not described above.

Figure 3:
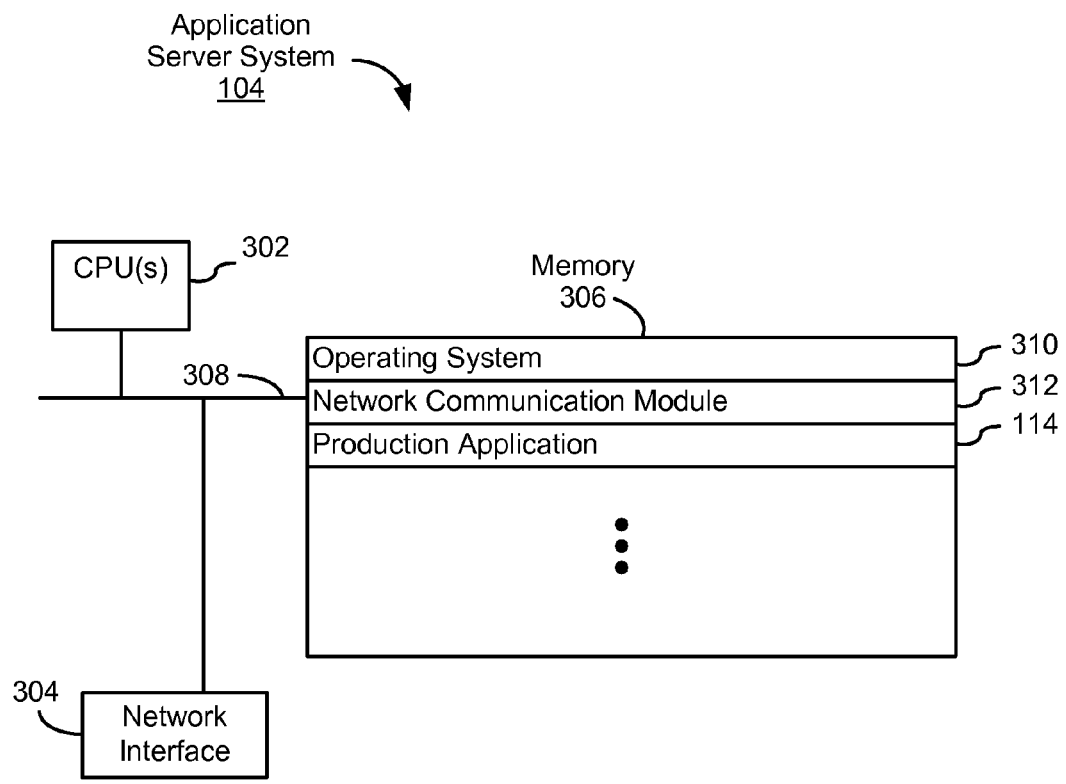
FIG. 3 is a block diagram illustrating an application server system, in accordance with some embodiments.

FIG. 3 is a block diagram illustrating Application Server 104 in accordance with some embodiments. Application Server 104, in some embodiments, includes one or more processing units CPU(s) 302 (also herein called processors), one or more network or other Network Interfaces 304, Memory 306, and one or more Communication Buses 308 for interconnecting these components. Communication Buses 308 optionally include circuitry (sometimes called a chipset) that interconnects and controls communications between system components. Memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternatively the non-volatile memory device(s) within Memory 306, comprises a non-transitory computer readable storage medium. In some embodiments, Memory 306 or alternatively the non-transitory computer readable storage medium stores the following programs, modules and data structures, or a subset thereof:

Operating System 310 which includes procedures for handling various basic system services and for performing hardware dependent tasks;

Network Communication Module (or instructions) 312 for connecting Application Server 104 to other computers (e.g., Client 102, Datastore Server 106 and Test System 108) via one or more Network Interfaces 304 (wired or wireless) and one or more Communication Networks 120 (FIG. 1), such as the Internet, other wide area networks, local area networks, metropolitan area networks, and so on; and Production Application 114 for receiving production user requests, transmitting them to one or more Datastore Servers 106 and relaying results to Client 102; in some embodiments Production Application 114 coordinates communications among the one or more Datastore Servers 106.

In some implementations, each of the above identified elements is stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 306 optionally stores a subset of the modules and data structures identified above. Furthermore, Memory 306 may store additional modules and data structures not described above.

Although FIG. 3 shows one Application Server 104, FIG. 3 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement one Application Server 104 and how features are allocated among them will vary from one implementation to another, and optionally depends in part on the amount of data traffic that the system must handle during peak usage periods as well as during average usage periods.

Figure 4:
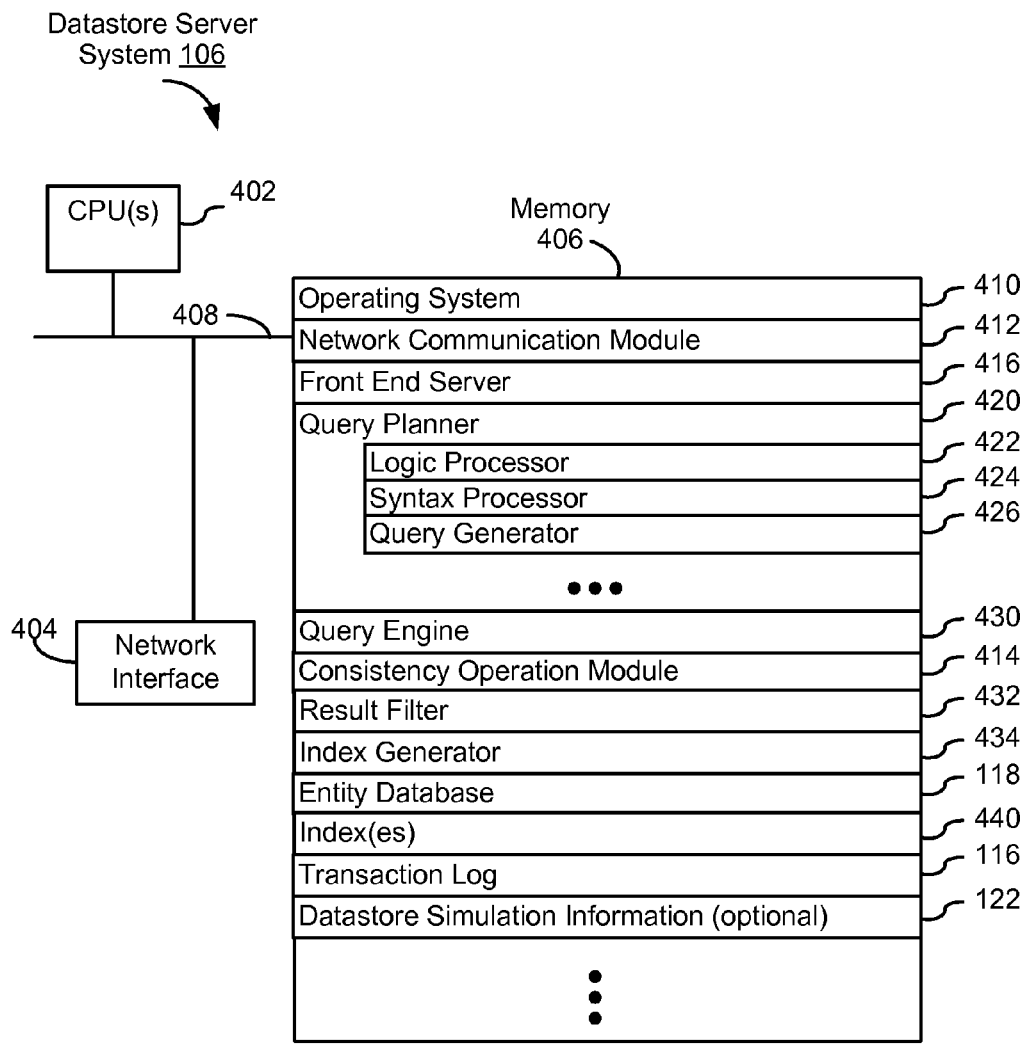
FIG. 4 is a block diagram illustrating a datastore server system, in accordance with some embodiments.

FIG. 4 is a block diagram illustrating Datastore Server 106 in accordance with some embodiments. Datastore Server 106 typically includes one or more processing units CPU(s) 402 (also herein called processors), one or more network or other Network Interfaces 404, Memory 406, and one or more Communication Buses 408 for interconnecting these components. Communication Buses 408 optionally include circuitry (sometimes called a chipset) that interconnects and controls communications between system components. Memory 406 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 406 optionally includes one or more storage devices remotely located from CPU(s) 402. Memory 406, or alternatively the non-volatile memory device(s) within Memory 406, comprises a non-transitory computer readable storage medium. In some embodiments, Memory 406 or alternatively the non-transitory computer readable storage medium stores the following programs, modules and data structures, or a subset thereof:

Operating System 410 that includes procedures for handling various basic system services and for performing hardware dependent tasks;

Network Communication Module (or instructions) 412 for connecting Datastore Server 106 to other computers (e.g., Application Server 104 and Test System 108) via one or more Network Interfaces 404 (wired or wireless) and one or more Communication Networks 120 (FIG. 1), such as the Internet, other wide area networks, local area networks, metropolitan area networks, and so on;

Frontend Server 416 for coordinating communications between Datastore Server 106, Application Server 104, Test System 108, and other computer systems with which Datastore Server 106 communicates;

Query Planner 420 for generating one or more queries from a client-specified query received from Application Server 104 or Client 102 and transmitting the one or more queries to Query Engine 430 for execution; in some implementations Query Planner 420 includes one or more of:

Logic Processor 422 for detecting logical relationships between query terms (e.g., search terms) in the client-specified query and optionally using the logical relationships to divide the query terms into one or more portions (e.g., sub-queries);

Syntax Processor 424 for parsing syntax of the client-specified query to determine the presence of consistency requirements, if any, to which the client-specified query or portions thereof are subject; and Query Generator 426 for generating one or more queries from the client-specified query in accordance with information from Logic Processor 422 and/or Syntax Processor 424 (e.g., splitting a particular portion of a client-specified query into two or more queries where the two or more queries are subject to different consistency requirements);

Query Engine 430 for executing one or more queries received from Application Server 104 or Client 102, and transmitting query results back to Application Server 104 or Client 102;

Consistency Operation Module 414 for applying data operations recorded in Transaction Log 116 to Entity Database 118;

Result Filter 432 for merging and filtering query results received from Query Engine 126 and transmitting the filtered results to Front End Server 416;

Index Generator 434 for generating indexes for use in executing search queries, in some implementations Index Generator 434 generates a large number of indexes (e.g., at least one index for each property that can be used to sort and/or filter search results) so that for each possible combination of filters and sort orders in a query, there exists an index including an index portion where the index entries matching the combination of filters are arranged in a contiguous block of index entries sorted in the sort order;

Entity Database 118 for storing entities or information about entities;

one or more Indexes 440 for storing information about entities and properties of the entities; in some embodiments, one or more Indexes 440 are sorted in accordance with values of the properties for the entities;

Transaction Log 116 for recording data operations that have been requested and, optionally, acknowledged, but not yet applied to entities stored in Entity Database 118; and optionally, Datastore Simulation Information 122 that includes information enabling Test System 108 to simulate inconsistencies in retrieved data and, optionally data and data modification operations for storage in Simulated Entity Database 128 and Simulated Transaction Log 126 of Test System 108.

In some implementations, each of the above identified elements is stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 406 optionally stores a subset of the modules and data structures identified above. Furthermore, Memory 406 optionally stores additional modules and data structures not described above.

Although FIG. 4 shows one Datastore Server 106, FIG. 4 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement one Datastore Server 106 and how features are allocated among them will vary from one implementation to another, and optionally depends in part on the amount of data traffic that the system must handle during peak usage periods as well as during average usage periods.

Figure 5:
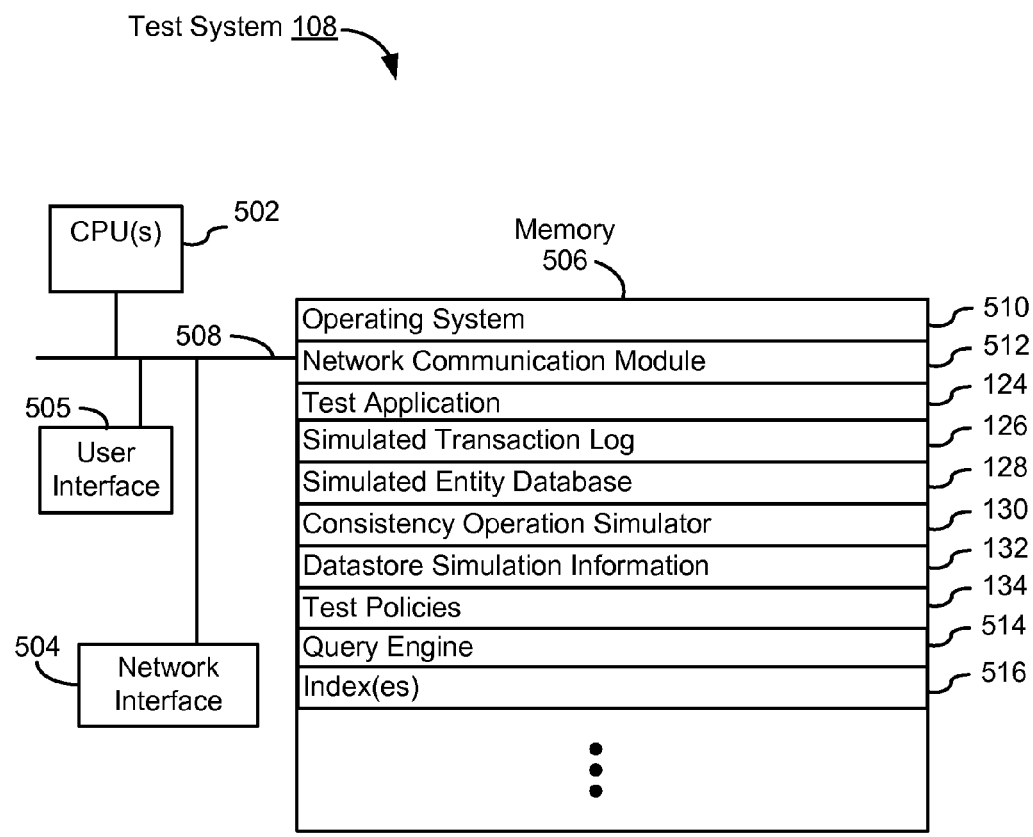
FIG. 5 is a block diagram illustrating a test system, in accordance with some embodiments.

FIG. 5 is a block diagram illustrating Test System 108 in accordance with some embodiments. Test System 108, in some embodiments, includes one or more processing units CPU(s) 502 (also herein called processors), one or more network or other Network Interfaces 504, Memory 506, and one or more Communication Buses 508 for interconnecting these components. Communication Buses 508 optionally include circuitry (sometimes called a chipset) that interconnects and controls communications between system components. Test System 108 optionally includes a user interface 505 comprising a display device and an input device (e.g., mouse, keyboard, trackpad, touch screen display). Memory 506 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 506 optionally includes one or more storage devices remotely located from CPU(s) 502. Memory 506, or alternatively the non-volatile memory device(s) within Memory 506, comprises a non-transitory computer readable storage medium. In some embodiments, Memory 506 or alternatively the non-transitory computer readable storage medium stores the following programs, modules and data structures, or a subset thereof:

Operating System 510 that includes procedures for handling various basic system services and for performing hardware dependent tasks;

Network Communication Module (or instructions) 512 for connecting Test System 108 to other computers (e.g., Client 102, Application Server 104 or Datastore Server 106) via one or more Network Interfaces 504 (wired or wireless) and one or more Communication Networks 120 (FIG. 1), such as the Internet, other wide area networks, local area networks, metropolitan area networks, and so on;

Simulated Transaction Log 126 for simulating Transaction Log 116, for example, for recording data operations that have been requested and, optionally, acknowledged but not yet applied to entities stored in Simulated Entity Database 128;

Simulated Entity Database 128 for simulating Entity Database 118, for example, for storing entities or information about entities;

Consistency Operation Simulator 130 for applying data operations recorded in Simulated Transaction Log 126 to Simulated Entity Database 128 in accordance with a test policy so as to generate test data having a predetermined degree of inconsistency between write operations and subsequent read operations;

Datastore Simulation Information 132 that includes information enabling Test System 108 to simulate inconsistencies in retrieved data and, optionally data and data modification operations for storage in Simulated Entity Database 128 and Simulated Transaction Log 126;

Test Policies 134 that includes information about how testing on Test Application 124 will be conducted, for example, how many or what is the percentage of data operations recorded in Simulated Transaction Log 126 will be applied by Consistency Operation Simulator 130 to entities in Simulated Entity Database 128; Test Policies 134 are optionally, based at least in part on input from a user testing Test Application 124 (e.g., indicating a predetermined degree of inconsistency for the test data provided to Test Application 124);

Query Engine 514 for executing one or more queries (e.g., one or more queries from Test Application 124 against Simulated Entity Database 128), and transmitting query results back to Test Application 124; and one or more Indexes 516 for storing information about entities and properties of the entities in Simulated Entity Database 128; in some embodiments, one or more Indexes 516 are sorted in accordance with values of the properties for the entities.

In some implementations, each of the above identified elements is stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 506 optionally stores a subset of the modules and data structures identified above. Furthermore, Memory 506 optionally stores additional modules and data structures not described above.

Although FIG. 5 shows Test System 108, FIG. 5 is intended more as functional description of the various features which may be present in a set of computer systems than as a structural schematic of the embodiments described herein. In practice, and as recognized by those of ordinary skill in the art, items shown separately could be combined and some items could be separated. For example, some items shown separately in FIG. 5 could be implemented on a single computer system and single items could be implemented by one or more computer systems. The actual number of computer systems used to implement one Test System 108 and how features are allocated among them will vary from one implementation to another, and optionally depends in part on the amount of data traffic that the system must handle during peak usage periods as well as during average usage periods.

FIG. 6A includes a block diagram illustrating an example of how values of entities change over time. T1, T2, T3 and T4 represent different points of time. The entity values shown in FIG. 6A correspond to the values for the entities after all transactions with a timestamp prior to that time have been applied (e.g., the "consistent" values for the respective entities). For example, the entity values (A=A3, B=B3, C=C2, D=D2 and E=(deleted)) at T5 represents the values of those entities as they will exist in Simulated Entity Database 128 after all transactions in Simulated Transaction Log 126 that correspond to those entities and have timestamps at or prior to T5 have been applied.

As shown in FIG. 6A, at time T1 entity A has a value of A1, at time T4 a data modification operation changes the value of A to A2, and at time T5 a data modification operation changes the value of A to A3. At time T2 entity B is created with value B1, at time T3 a data modification operation changes the value of B to B2, and at time T5 a data modification operation changes the value of B to B3. At time T3 entity C is created with value C1, at time T5 a data modification operation changes the value of C to C2. At time T1 entity D is created with value D1, at time T2 a data modification operation changes the value of D to D2. At time T1 entity E is created with value E1, at time T2 a data modification operation changes the value of E to E2, at time T3 a data modification operation changes the value of E to E3, at time T4 a data modification operation changes the value of E to E4, and at time T5 entity E is deleted.

FIG. 6B includes a block diagram illustrating an example of Simulated Transaction Log 126, in accordance with some embodiments. In some embodiments, a data operation on Simulated Transaction Log 126 includes information about operation type, relevant entity, and a timestamp, for example, in the form of {Operation Type; Relevant entity, (new entity value); Timestamp}. In some embodiments, as shown in FIG. 6B, operation type includes "Create" (creating an entity with an initial value), "Modify" (changing the value of an existing entity to a new value), and "Delete" (removing an entity from entity database). In other embodiments, read operation is also recorded in transaction log (not shown).

In some embodiments, the number or percentage of data operations that are to be applied to the simulated entity database is specified by a user or by a test policy. For example, in FIG. 6B, in one scenario, 50% of the data operations in Simulated Transaction Log 126 are applied. In another scenario, 75% of the data operations are applied. In some implementations the percentage of data operations to be applied refers to a percentage of the data modification operations (e.g., read operations are ignored, for the purposes of determining a percentage of operations in Simulated Transaction Log 126 to apply). In some embodiments, the timestamp corresponds to a time at which the data operation was requested. For example, in Operation 602 {Create; entity D, D1; T1}, timestamp T1 indicates that Operation 602 was requested at time T1. In some embodiments, the timestamp corresponds to a time at which the data operation was acknowledged.

In some implementations, data operations in the simulated transaction log are applied at least in part based on their timestamps (e.g., data operations are applied in an order similar to the order in which they are first requested). In such implementations, "older" operations (operations that are requested at an earlier time) are more likely to be applied than more recent operations (operations that are requested at a later time). As one example of such an implementation with reference to Simulated Transaction Log 126 in FIG. 6B, Operation 602 (timestamp=T1) is applied before Operation 604 (timestamp=T2), because T1 is before T2.

In other embodiments, data operations on Simulated Transaction Log 126 are applied randomly. Thus, in some situations, at least some data operations having later timestamps are applied before operations having earlier timestamps. For example, in an implementation where operations are applied randomly, if Operation 606 is randomly selected for performance and Operation 604 is not, then Operation 606 will be applied before Operation 604 is applied, even though Operation 606 has a later timestamp than Operation 604.

In other embodiments, a predefined percentage of the data operations in Simulated Transaction Log 126 are randomly selected to be applied. This simulates a common consistency pattern in a high-replication datastore where after a data modification operation is received it is transmitted to a plurality of different Datastore Servers 106, each of which has a respective transaction log and applies operations from the transaction log at a different rate. Thus, after a respective data modification operation for a respective entity has been acknowledged, there will be a period of time where some copies of the respective entity (at a first subset of Datastore Servers 106) have been updated in accordance with the respective data modification operation and other copies (at a second subset of the Datastore Servers 106) of the respective entity have not been updated in accordance with the respective data modification operation. When the respective entity is requested during this period of time, whether the respective entity is consistent with the respective data modification operation will depend on the Datastore Server 106 from which the entity was retrieved. As such, the predefined percentage, in this example, corresponds to the percentage of Datastore Servers 106 in the second subset of Datastore Servers 106 (e.g., the datastore servers that have not yet applied the respective data modification operation).

As shown in FIG. 6B, the operations in Simulated Transaction Log 126 have been randomly selected to be applied in accordance with a predefined percentage. Thus, if the predefined percentage of operations is greater than zero, there is no guarantee that any particular operation will be applied. For example, in FIG. 6B, Operation 606, which is applied when 50% of the operations are applied, is not applied when 75% of the operations are applied. Alternatively, in other embodiments, data operations applied at a low predefined percentage are also applied when the predefined percentage is higher. The former approach allows greater randomness in the test data, thereby providing more test coverage. The latter approach allows the data inconsistency to be generated gradually, thereby allowing incremental testing.

In some embodiments, the actual number of data operations applied is an approximation of the predefined percentage specified, for example, by a user or a test policy. For example, in FIG. 6B, fourteen data operations are included in Simulated Transaction Log 126; ten data operations are applied when the predefined percent is 75%, even though this is slightly less than 75%. This approach allows the predefined percentage to be specified by an application tester without exact knowledge of the simulated transaction log.

In some embodiments, the predefined percentage of data operations applied includes 100%. In other words, in some situations, a user can specify that all data operations in Simulated Transaction Log 126 are to be applied. When all data operations are applied, test data generated are strongly consistent. This approach allows the comparison of the test data generated with various predetermined degrees of inconsistency with strongly consistent test data.

Figures 6C, 6D:
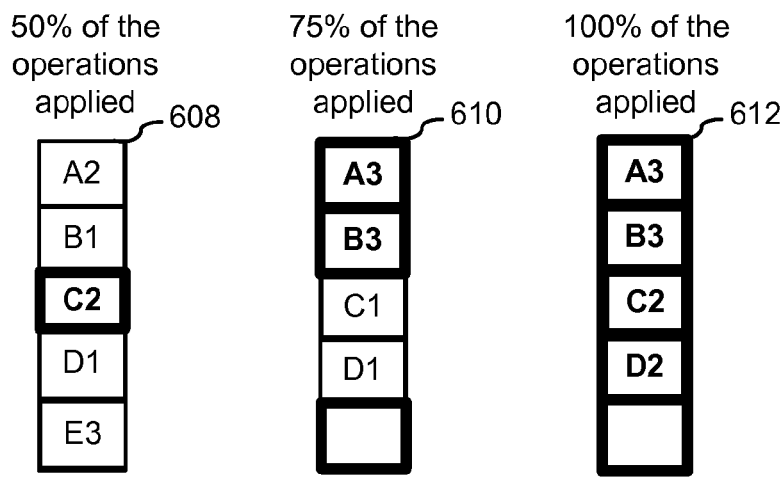
FIG. 6C is a block diagram illustrating test data generated after data operations have been applied based a on a test policy, in accordance with some embodiments.
FIG. 6D is a block diagram illustrating parameters for a datastore simulation test policy, in accordance with some embodiments.

FIG. 6C includes a block diagram illustrating several sets of test data generated after the various percentages of test data are applied in accordance with the example Transaction Log 126 in FIG. 5B. Test Data 608 are generated after 50% of the operations on Simulated Transaction Log 126 are applied. Data inconsistencies in Test Data 608 include A2, B1, D1, and E3. Test Data 610 are generated after 75% of the operations on Simulated Transaction Log 126 are applied. Data inconsistencies in Test Data 610 include C1, and D1. Test Data 612 are generated after 100% of the operations on Simulated Transaction Log 126 are applied, thus including no data inconsistency.

As shown in FIG. 6C, in some situations, the percentage of data inconsistency does not correspond directly to the predefined degree of inconsistency (e.g., because Simulated Transaction Log 126 can include multiple data modification operations for the same data item, which provides multiple opportunities for a data modification operation to be deliberately not performed, thereby rendering the entity inconsistent). For example, there are four different data modification operations for entity E in Simulated Transaction Log 126 in FIG. 6B, while there are only two different data modification operations for Entity D in Simulated Transaction Log 126 in FIG. 6B. Thus, in this example, it is more likely that a data modification operation for Entity E will not be applied than it is that a data modification operation for Entity D will not be applied.

FIG. 6D includes a block diagram illustrating an example relationship between age information and a percentage of operations in transaction log that have been applied, in accordance with some embodiments. In some embodiments, age information describes the length of time between a data operation is requested and when it is applied to a database. As shown in FIG. 6D, in some embodiments, for older data modification operations, a higher percentage of the operations are applied to the simulated entity database. This approach allows a more realistic simulation of a high-replication datastore where the likelihood that a data modification operation has been applied at a particular Datastore Server 106 increases with the age of the data modification operation. For example, in a high-replication datastore where copies of a respective entity are stored at a plurality of different Datastore Servers 106, the percentage of operations applied corresponds to a percentage of Datastore Servers 106 that have applied the data modification operation to the respective entity. As such, the test policy parameters illustrated in FIG. 6D are for simulating a high-replication datastore where: if a data modification operation is five milliseconds or more older, then, on average, at least 99% of the Datastore Servers 106 have applied the data modification operation; whereas if a data modification operation is between 2 and 5 milliseconds old, then, on average, at least 75% of the Datastore Servers 106 have applied the data modification operation; and if a data modification operation is less than 1 millisecond old, then, on average, at least 50% of the Datastore Servers 106 have applied the data modification operation. In some embodiments, the test policy parameters are provided by a user. In some embodiments, the test policy parameters are generated based on statistical measurements from a corresponding high-replication datastore (e.g., Datastore Servers 106 in FIG. 1).

FIG. 7 includes a flowchart illustrating a method for creating test data, in accordance with some embodiments. Method 700 is, optionally, governed by instructions that are stored in a non-transitory computer readable storage medium and that are executed by one or more processors of one or more servers (e.g., Test System 108, FIG. 5). Each of the operations shown in FIG. 7 typically corresponds to instructions stored in a computer memory or non-transitory computer readable storage medium (e.g., memory 506 of Test System 108 in FIG. 5). In some implementations, the non-transitory computer readable storage medium includes a magnetic or optical disk storage device, solid state storage devices such as Flash memory, or other non-volatile memory device or devices. In some implementations, the computer readable instructions stored on the computer readable storage medium include one or more of: source code, assembly language code, object code, or other instruction format that is interpreted or executed by one or more processors. In various embodiments, some operations in method 700 may be combined and/or the order of some operations may be changed from the order shown in FIG. 7.

In some embodiments, an application tester (e.g., a user of Client 102 or Test System 108) first provides (702) a test application to Test System 108 for testing. In some embodiments, Datastore Server 106 also provides (704) datastore simulation information, such as information included in Datastore Simulation Information 122, to Test System 108. Test System 108 initializes (706) a simulated datastore using the datastore simulation information and, optionally, the test application.

After the simulated datastore is initialized, in some embodiments, the application tester further provides (708) initial data (e.g., information about testing averment) to Test System 108. Alternatively, in some situations, Datastore Server 106 provides (710) initial data (e.g., information included in Database Simulation Information 122) to Test System 108 instead of or in addition to the initial data provided by Client 102 or the user of Test System 108. Test System 108 uses the initial data to store (712) Simulated Entity Database 128, and Simulated Transaction Log 126, which includes operations waiting to be performed on Simulated Entity Database 128.

In some embodiments, the application tester also provides (714) one or more consistency parameters to Test System 108 (e.g., information indicating a predefined degree of inconsistency for the test data). In some embodiments, Datastore Server 106 provides (716) one or more test policy templates to Test System 108 (e.g., a random test policy or a time-based test policy as described in greater detail above with reference to FIGS. 6A-6D). In some embodiments, based on the one or more consistency parameters and/or test policy templates, Test System 108 obtains (718) a test policy. In some implementations the test policy is generated by Test System 108. In other implementations the test policy is received from Datastore Server 106 or the application tester.

In some embodiments, the application tester then sends (720), to Test System 108, a request to provide test data to a test application (e.g., Test Application 124). After receiving (722) the request to provide test data to the application, Test System 108 selects (724) a first subset of operations from the Simulated Transaction Log 126 to perform on Simulated Entity Database 128 in accordance with the test policy. In some embodiments, Test System 108 deliberately excludes (726) a second subset of operations from performance on Simulated Entity Database 128. In other words, in some situations, Test System 108 intentionally does not apply the second subset of operations on Simulated Entity Database 128 so as to better simulate the inconsistency in data generated by a high-replication datastore from which the application will retrieve data after it has been tested.

After operations in Simulated Transaction Log 126 are applied (or deliberately not applied), Test System 108 generates (728) test data, which is, in turn, provided to the application tester, where the test data is received and/or analyzed (730). As the test data has a predetermined degree of inconsistency, the application tester can ascertain what effect this inconsistency had on the application based on output data from the application. Additionally, the application tester can re-run a test on the application with a different predetermined degree of inconsistency to determine what effect the differences in the predefined degree of inconsistency between the two tests had on the application. Additionally, the predetermined degree of inconsistency can be defined so that the same inconsistencies are reproduced multiple times, which can help the application tester to determine whether a previously identified error caused by inconsistencies in the data has been resolved. Similarly, testing an application using test data having reproducible inconsistencies can be useful for unit testing where a finished device including the application is being tested to determine whether the device/application meets predefined quality control standards.

The particular order in which the operations in FIG. 7 have been described are merely exemplary and are not intended to indicate that the described order is the only order in which the operations could be performed. One of ordinary skill in the art would recognize various ways to reorder the operations described herein. Additionally, details of other processes described herein with respect to method 800 (described herein with reference to FIGS. 8A-8C) are also applicable in an analogous manner to method 700 described above with respect to FIG. 7. For example, the database simulation information, the test policy, the consistency parameters and the operations described above with reference to method 700 may have one or more of the characteristics of the database simulation information, the test policy, the consistency parameters and the operations described herein with reference to method 800. For brevity, these details are not repeated here.

Figure 8A:
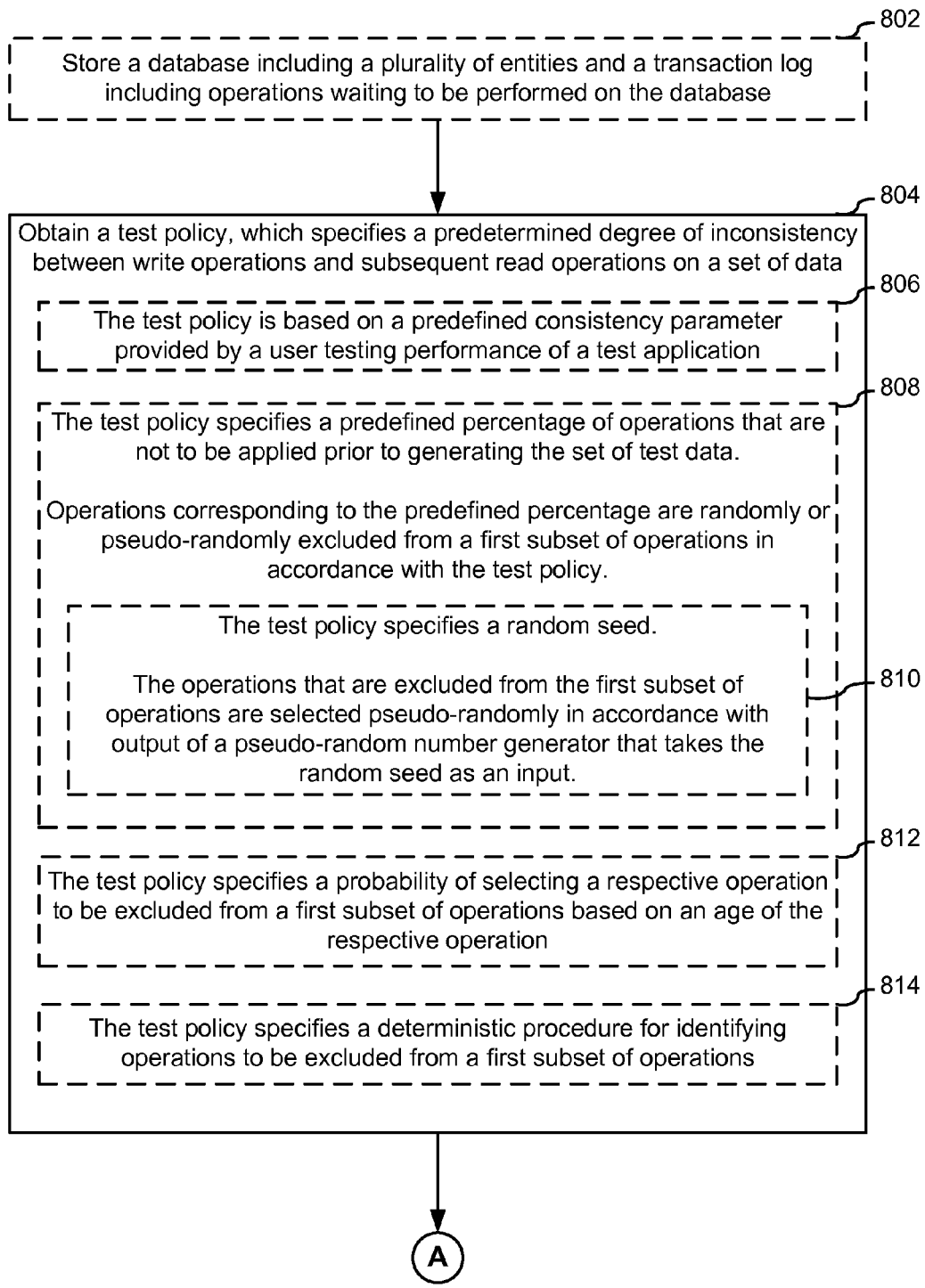
FIGS. 8A-8C include a flow chart illustrating a method for creating test data at a server system, in accordance with some embodiments.
Figure 8B:
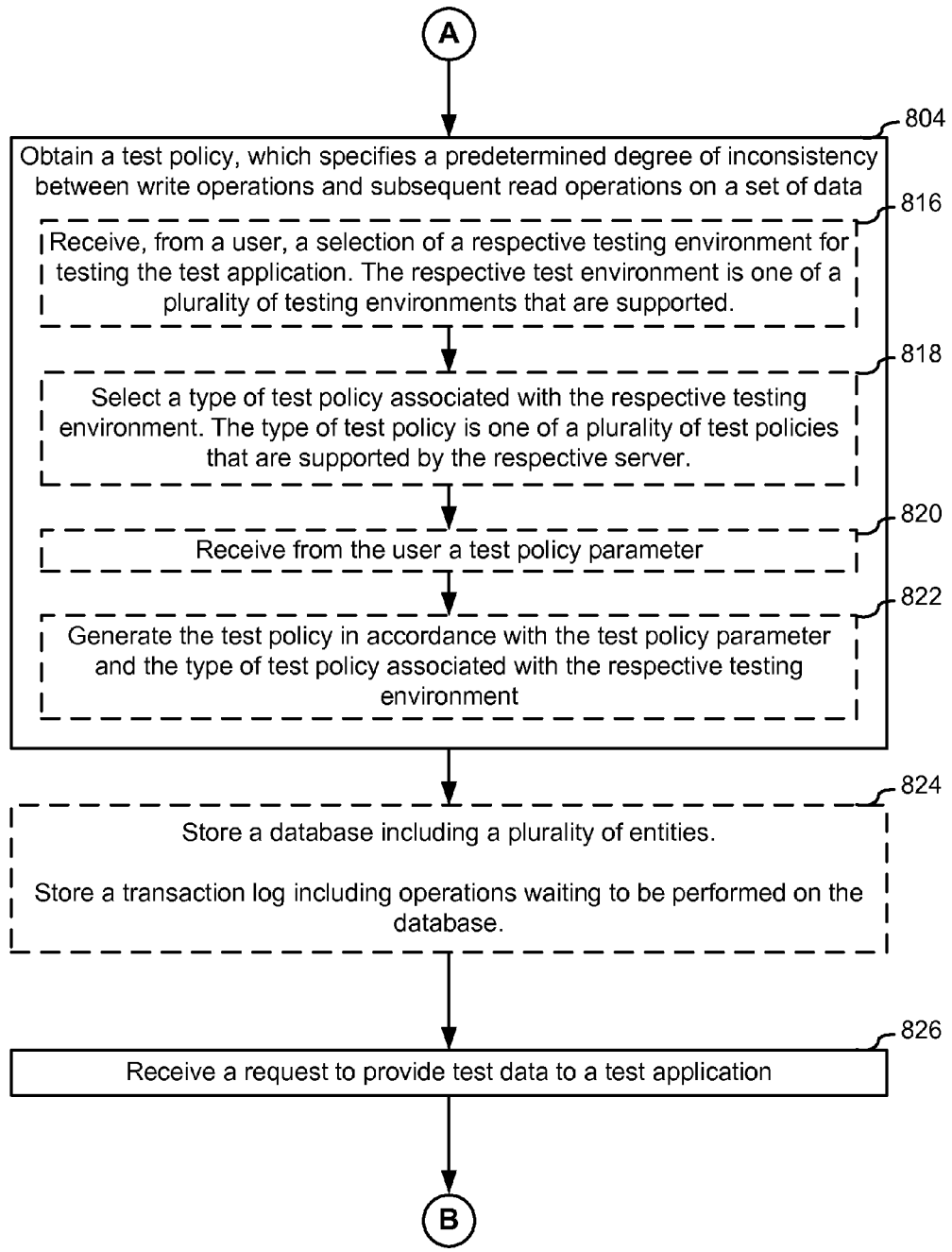
Figure 8C:
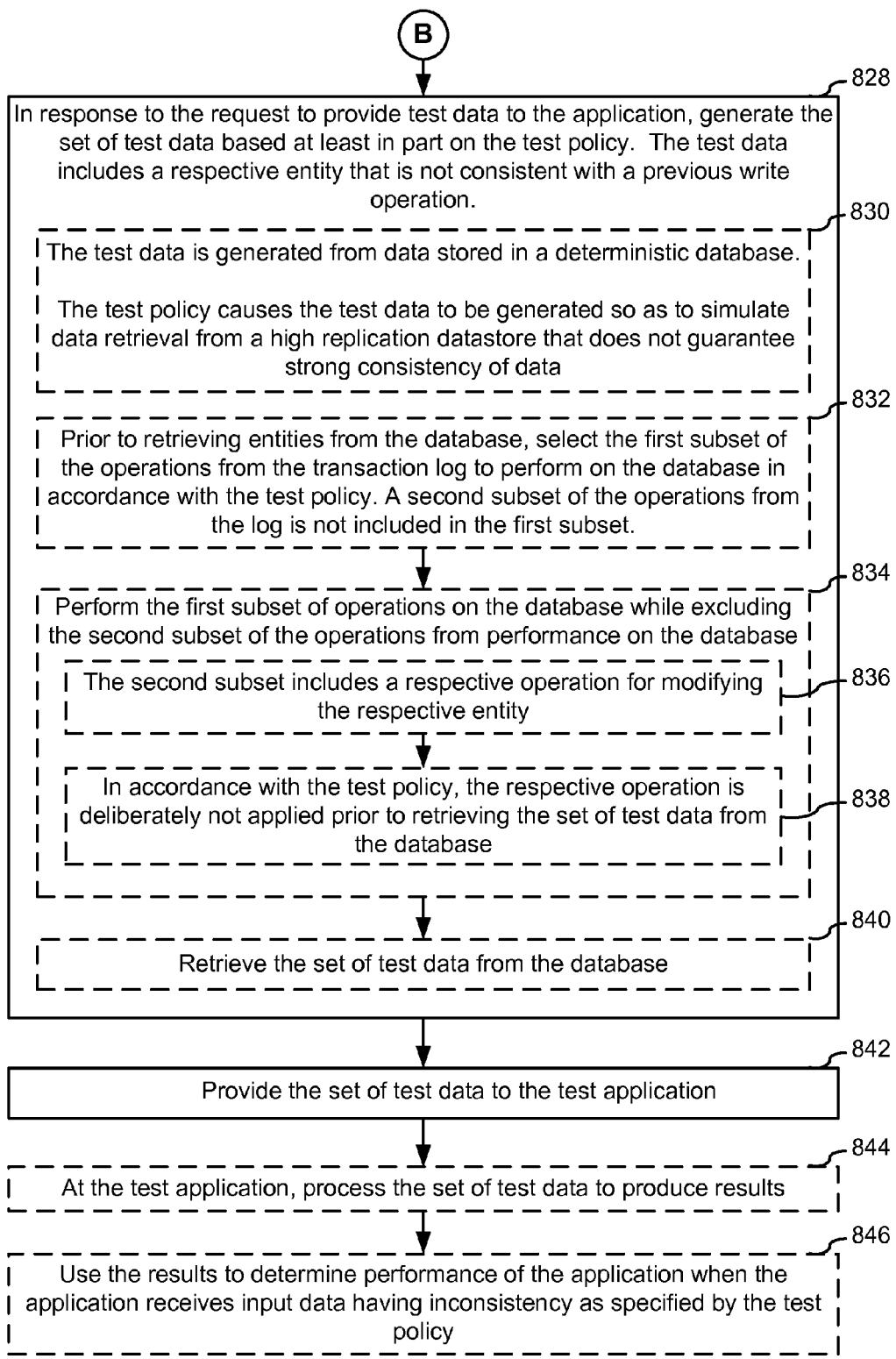

FIGS. 8A-8C include a flowchart representing a method for creating test data, according to certain embodiments. Method 800 is, optionally, governed by instructions that are stored in a non-transitory computer readable storage medium and that are executed by one or more processors of one or more servers (e.g., Test System 108, FIG. 5). In some implementations, each of the operations shown in FIGS. 8A-8C corresponds to instructions stored in a computer memory or non-transitory computer readable storage medium (e.g., memory 506 of Test System 108 in FIG. 5). In some implementations, the computer readable storage medium includes a magnetic or optical disk storage device, solid state storage devices such as Flash memory, or other non-volatile memory device or devices. In some implementations, the computer readable instructions stored on the computer readable storage medium include one or more of: source code, assembly language code, object code, or other instruction format that is interpreted or executed by one or more processors. In various embodiments, some operations in method 800 may be combined and/or the order of some operations may be changed from the order shown in FIGS. 8A-8C.

In some embodiments, Test System 108 stores (802) a plurality of entities in a database (e.g., Simulated Entity Database 128 in FIG. 1). In some embodiments, Test System 108 also stores a simulated transaction log (e.g., Simulated Transaction Log 126 in FIG. 1), which includes operations waiting to be performed on the database. In some embodiments, the simulated transaction log includes one or more write operations, such as create, modify/update and/or delete operations, which, when applied to the database, will affect the values of entities stored in the database. In some embodiments, the simulated transaction log also includes data operations that do not modify entity values, such as read operations. Whether read operations in the simulated transaction log are applied to the database does not affect the degree of data inconsistency in the test data directly. Thus, in some embodiments, the read operations in the simulated transaction log are ignored for the purposes of determining a predefined percentage of operations to apply. In some embodiments, the simulated transaction log includes operations to be performed on entities already stored in the database, for example, entity modify operation ("Modify" Operation 604 in FIG. 6B) or entity deletion operation ("Delete" Operation in FIG. 6B). In some embodiments, the simulated transaction log also includes operations to add new entities to the database, such as "Create" Operation 602 in FIG. 6B. The stored database and transaction log are used by Test System 108 to generate test data for testing a test application (e.g., Test Application 124).

Test System 108 obtains (804) a test policy, which specifies a predetermined degree of inconsistency between write operations and subsequent read operations on a set of data. In some implementations, obtaining the test policy includes generating the test policy (e.g., based on information from Datastore Server 106 and/or Client 102). In some implementations, obtaining the test policy includes receiving the test policy from either Datastore Server 106 or Client 102. In some implementations, obtaining the test policy includes receiving the test policy from a user of Test System 108.

In some embodiments, the test policy simulates a predetermined degree of inconsistency between the write operations and subsequent read operations that occurs in a high-replication database (e.g., Datastore Servers 106 in FIG. 1) when the high-replication database is operating within normal operating parameters. In other words, the inconsistency is deliberately created—not due to an unexpected event, for example, hardware malfunction or network failure—in order to test how an application (e.g., Test Application 124) behaves when it receives inconsistent data.

In some embodiments, the inconsistency between the write operations and read operations occurs when an "old" version of an entity is returned (for example, D1 in Test Data 608 in FIG. 6C), in response to a request for the entity. In this example, the old version of the entity is returned because a previously requested/committed write operation (for example, Operation 604 in FIG. 6B) has not yet been applied to an entity in the database. In other words, the inconsistency is not randomly generated "junk" data, but merely "out of date" data. In some embodiments, the predetermined degree of inconsistency is greater than zero. In other words, there is always at least one inconsistency in the test data generated by Test System 108. For example, Test Data 608 and 610. Alternatively, in other embodiments, the predetermined degree of inconsistency can be set by the application tester to zero. In other words, in some implementations, there are situations where the predetermined degree of inconsistency is specified to be zero, so that the test data is strongly consistent (e.g., Test Data 612 in FIG. 6C). In some situations, the option to generate strongly consistent test data (e.g., data where the degree of inconsistency equals zero) is useful when comparing the performance of an application that receives test data with inconsistency and test data without inconsistency (e.g., so as to determine whether data inconsistency is the cause of identified errors in output of Test Application 124).

In some embodiments, the test policy is based on a predefined consistency parameter (806) provided by a user (e.g., an application tester) testing performance of a test application (e.g., Test Application 124). For example, in FIG. 6B the predefined consistency parameter is percentage information, which specifies a percentage of data modifications operations recorded in transaction log that are to be applied prior to generating test data. In this example, the user could select either 50%, 75% or some other percentage of data modification operations in the transaction log to apply. In some embodiments, the actual number of operations applied is an approximation of the predefined percentage (e.g., because Simulated Transaction Log 126 includes a discrete number of data modification transactions).

Rather than specifying the percentage of operation that are to be applied, in some embodiments, the test policy specifies a predefined percentage of operations that are not to be applied (excluded from application) prior to generating the set of test data. In some embodiments, operations corresponding to the predefined percentage are randomly or pseudo-randomly excluded from a first subset of operations in accordance with the test policy. In some embodiments, the operations that are not to be applied are affirmatively excluded. Alternatively, in other embodiments, operations are excluded by virtue of their absence from the first subset of operations, which includes operations that are to be applied. Test policies that randomly or pseudo-randomly excluded the predefined percentage of operations from application are sometimes called random policies.

In some embodiments, although the predefined percentage specifies the percentage of operations that are not to be applied, it does not specifically or deterministically identify those operations are; instead, the operations that are excluded (808) from being applied are randomly or pseudo-randomly selected. For example, in FIG. 6B, when the predefined percentage is specifies as 50%, Operations 602 and 606 are randomly selected, while Operation 604 is randomly excluded. In some of these embodiments, the test policy specifies (810) a random seed, and the operations that are excluded from the first subset of operations are selected pseudo-randomly in accordance with output of a pseudorandom number generator that takes the random seed as an input (e.g., in addition to a value specifying the percentage of operations to be applied). In some implementations the output of the pseudorandom number generator remains the same, as long as the random seed maintains the same value. As such, for a given random seed, the operations that are to be excluded from application during testing will also remain the same. This approach allows test data to be generated randomly or pseudo-randomly in a repeatable manner (e.g., so that a user can repeat a test on a test application). For example, if a user determines that a test application does not meet predefined quality criteria for a set of test data generated using a respective random seed, the user can modify the test application and run the same test on the modified test application by using the same respective random seed as an input for the test policy and thereby determine whether or not the update to the test application fixed the previously identified problem.

In some embodiments, the test policy specifies (812) a probability of selecting a respective operation to be excluded from a first subset of operations based on an age of the respective operation. In some embodiments, operations in the simulated transaction log are also associated with age information (e.g., an operation request timestamp or an operation acknowledgement timestamp), which can be compared with a current time to determine an "age" of the operation. For example, as shown in FIG. 6D, operations with different ages are associated with different percentages of successfully applied operations. The example in FIG. 6D illustrates a test policy that simulates behavior of a high-replication datastore, where older operations are more likely to have been applied at the database from which an entity is requested. This approach provides a close simulation to a production environment, in which operations on transaction logs are applied on an FIFO (First In First Out) basis, and the more time has passed since operations have been requested, the more likely these operations have been applied. Test policies that employ operation age information are sometimes called time-based policies.

In some embodiments, the test policy specifies (814) a deterministic procedure (deterministic test policies) for identifying operations to be excluded from a first subset of operations. In other words, prior to applying the operations, a user specifically identifies particular operations or particular types of operations that are to be performed and/or identifies particular operations or particular types of operations that are to be intentionally excluded from being performed. When using a deterministic test policy, the user can test particular features of test application to determine how test application performs when presented with particular data inconsistencies. Moreover, once testing is completed, or during the error-correction (debugging) process, knowing which data operations were, in fact, applied (and which operations were not) during the testing process, can be very helpful in identifying problems with the test application. A deterministic test policy is also easily reproducible which enables a user to determine whether a change to an application fixed a preexisting problem with the application. Test policies that employ deterministic procedures are sometimes called deterministic policies.

In some embodiments, the test policy is generated based on the testing environment and/or a test policy parameter specified by a user. In some embodiments, prior to generating the test data, Test System 108 receives (816), from a user, a selection of a respective testing environment for testing the application from a plurality of testing environments that are supported by Test System 108. For example, the plurality of testing environments supported by Test System 108 include: a random testing environment for testing operation of an application when provided with data having a predefined degree of inconsistency (e.g., using a random test policy); a deterministic testing environment for testing response of an application to particular inconsistencies (e.g., using a deterministic test policy); and a production-simulation testing environment for simulating operation of the application in accordance with parameters of a high-replication datastore (e.g., using a time-based test policy).

In response to receiving the selection of the respective testing environment, Test System 108 selects (818) a type of test policy (e.g., random, time-based, or deterministic) associated with the respective testing environment and supported by Test System 108. In some embodiments, Test System 108 also receives (820) a test policy parameter from a user. Depending on the selected test policy, the test policy parameter can include a random seed, a percentage of operations that are excluded from application, or a location from which a deterministic policy (e.g., a data file that includes user-specified instructions for performing/forgoing performance of operations) can be retrieved. After receiving the test policy parameter, Test System 108 generates (822) the test policy in accordance with the test policy parameter and the type of test policy associated with the respective testing environment.

In some implementations, after obtaining the test policy, Test System 108 stores (824) a transaction log (e.g., Simulated Transaction Log 126 in FIG. 1) including operations waiting to be performed on the database. After the simulated entity database and/or simulated transaction log are stored, Test System 108 receives (826) a request to provide test data to a test application (e.g., Test Application 124). In some embodiments, the request comes from the application tester via Client 102. In some embodiments, the request is received from an application tester that is operating Test System 108.

In response to the request to provide test data to the application, Test System 108 generates (828) a set of test data based on at least in part on the test policy. In some embodiments (e.g., where the predetermined degree inconsistency is greater than zero) the test data includes at least a respective entity that is not consistent with a previous write operation. For example, the respective entity has a write operation that has been committed but not yet applied. In particular, in FIG. 6C, example test data 608 includes D1, which is not consistent with a previous write operation, Operation 604 {Modify; entity D, D2; T2}, which changes the value of entity D from D1 to D2.

In some embodiments, the test data is generated (830) from data stored in a deterministic database (e.g., Simulated Entity Database 128 in FIG. 1), and the test policy causes the test data to be generated so as to simulate data retrieval from a high-replication datastore (e.g., Datastore Servers 106 in FIG. 1) that does not guarantee strong consistency of data. In a deterministic database an operation is acknowledged as applied after it is applied to all available copies of an entity. In a deterministic database, therefore, a subsequent read operation will return a value for the entity in a deterministic manner based on whether or not the operation has been applied. For example, if the previous write operation has been acknowledged as applied, the new value for the entity will be returned. Alternatively, if the previous write operation has not been acknowledged as applied, the old value for the entity will be returned. In contrast, in some implementations a high-replication datastore acknowledges an operation has having been applied after the operation has been applied to at least a predefined percentage of copies of the entity. Thus, in a high-replication datastore, a write operation will sometimes be acknowledged as applied even when there are some copies of the entity to which the write operation has not yet been applied. As such, a subsequent read operation will return different values, depending on which copy of the entity is retrieved. In some embodiments, a high-replication datastore includes a large number of replicas for an entity stored in different Datastore Servers 106. Thus, the high-replication datastore described above does not guarantee strong consistency of the data stored therein, because, in some cases, a write operation is applied to some but not all Datastore Servers 106.

In some embodiments, prior to retrieving entities from the database, Test System 108 selects (832) a first subset of the operations from the transaction log and performs the first subset of operations on the database (e.g., Simulated Entity Database 128 in FIG. 1) in accordance with the test policy. For example, in FIG. 6B, when 75% of the operations are to be applied, the transactions marked with "x" in the 75% column are applied to Simulated Entity Database 128 by Test System 108. In some embodiments, a second subset of the operations from the transaction log is not included in the first subset, for example, the transactions not marked with "x" in FIG. 6B.

After the first subset and/or the second subset are selected, Test System 108 performs (834) data operations in the first subset of operations on the database while excluding operations in the second subset from performance. In some embodiments, the second subset includes (836) a respective operation for modifying the respective entity, and in accordance with the test policy, the respective operation is deliberately not applied (838) prior to retrieving the set of test data from the simulated entity database. After performing the first subset of operations, Test System 108 retrieves (840) the set of test data from the database. In these embodiment, the test data includes at least one inconsistency. For example, in FIG. 6B, when 50% of the data operations are performed, seven operations (marked with "x" in the "50%" column) in Simulated Transaction Log 126 are selected as the first subset and performed on Simulated Entity Database 128, while the remaining seven operations, which that are excluded from performance (not marked with "x"), constitute the second subset. In this example, the data inconsistency is deliberately generated—as opposed to due to unexpected system failures, e.g., hardware malfunction—in order to observe and test how an application (e.g., Test Application 124) behaves when it receives inconsistent data.

After generating the test data, Test System 108 provides (842) the test data to the test application. For example, Test System 108 provides the test data to Test Application 124 as input data. In some embodiments, Test Application 124 is stored and executed by Test System 108. In some embodiments, Test Application 124 is stored remotely from Test System 108 and is executed by a different computer system (e.g., Client 102 or Application Server 104). In some embodiments, after receiving the test data, the test application processes (844) the test data and produces test results. In some embodiments, the test results are then used to determine (846) performance of the test application when test the application receives input data having inconsistency as specified by the test policy. In other words, the test data having the predetermined degree of inconsistency can be used to identify problems with applications that are to be used with a high-replication datastore by presenting the application with inconsistent data and identifying any errors produced by the application based on the inconsistent data.

It should be understood that the particular order in which the operations in FIGS. 8A-8C have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 700 (described herein with reference to FIG. 7) are also applicable in an analogous manner to method 800 described above with respect to FIGS. 8A-8C. For example, the database simulation information, the test policy, the consistency parameters and the operations described above with reference to method 800 may have one or more of the characteristics of the database simulation information, the test policy, the consistency parameters and the operations described herein with reference to method 700. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a respective computer system having one or more processors and memory storing one or more programs that when executed by the one or more processors cause the respective computer system to perform the method, the method comprising:
obtaining a test policy that specifies a predetermined degree of deliberate inconsistency between write operations and subsequent read operations on a set of data;
receiving a request to provide test data to an application; and
in response to the request to provide test data to the application, performing a sequence of operations, including:
accessing a transaction log that includes operations waiting to be performed on a database, wherein the database includes a plurality of entities;
selecting a first subset of operations from the transaction log to perform on the database in accordance with the test policy, wherein a second subset of operations from the transaction log is not included in the first subset of operations;
performing the first subset of operations on the database in accordance with the test policy while excluding the second subset of operations from performance on the database;
retrieving the test data from the database, wherein the test data includes a respective entity of the plurality of entities that is not consistent with a write operation in the second subset of operations; and
providing the test data to the application.

2. The method of claim 1, wherein:
the application processes the test data to produce results; and
the results are used to determine performance of the application when the application receives input data having the predetermined degree of deliberate inconsistency as specified by the test policy.

3. The method of claim 1, wherein the application is a test application and further wherein the test application includes a test version of a production application that is being tested.

4. The method of claim 1, wherein:
the second subset includes a respective operation for modifying the respective entity; and
in accordance with the test policy, the respective operation is deliberately not applied prior to retrieving the test data from the database.

5. The method of claim 1, wherein:
the test policy specifies a predefined percentage of operations that are not to be applied prior to retrieving the test data; and
a number of operations corresponding to the predefined percentage are randomly or pseudo-randomly excluded from the first subset in accordance with the test policy.

6. The method of claim 5, wherein:
the test policy specifies a random seed; and
the operations that are excluded from the first subset of operations are selected pseudo-randomly in accordance with output of a pseudorandom number generator that takes the random seed as an input.

7. The method of 1, wherein the test policy specifies a probability of selecting a respective operation to be excluded from the first subset of operations based on an age of the respective operation.

8. The method of 1, wherein the test policy specifies a deterministic procedure for identifying operations to be excluded from the first subset of operations.

9. The method of claim 1, wherein:
the test policy causes the test data to be generated so as to simulate data retrieval from a high replication datastore that does not guarantee strong consistency of data.

10. The method of claim 1, further comprising:
prior to retrieving the test data, receiving, from a user, a selection of a respective testing environment for testing the application, wherein the respective test environment is one of a plurality of testing environments that are supported by the respective computer system; and
in response to receiving the selection of the respective testing environment, selecting a type of test policy associated with the respective testing environment, wherein the type of test policy is one of a plurality of test policies that are supported by the respective computer system; and
receiving, from the user, a test policy parameter,
wherein obtaining the test policy includes generating the test policy in accordance with the test policy parameter and the type of test policy associated with the respective testing environment.

11. A computer system, comprising:
one or more processors;
memory; and
one or more programs, wherein the one or more programs are stored in the memory and configured to be executed by the one or more processors, the one or more programs including instructions for:

obtaining a test policy that specifies a predetermined degree of deliberate inconsistency between write operations and subsequent read operations on a set of data;

receiving a request to provide test data to an application; and in response to the request to provide test data to the application, performing sequence of operations, including:

accessing a transaction log that includes operations waiting to be performed on a database, wherein the database includes a plurality of entities;

selecting a first subset of operations from the transaction log to perform on the database in accordance with the test policy, wherein a second subset of operations from the transaction log is not included in the first subset of operations;

performing the first subset of operations on the database while excluding the second subset of operations from performance on the database;

retrieving the test data from the database, wherein the test data includes a respective entity that is not consistent with a write operation in the second subset of operations; and providing the test data to the application.

12. The system of claim 11, wherein:

the application processes the test data to produce results; and the results are used to determine performance of the application when the application receives input data having the predetermined degree of deliberate inconsistency as specified by the test policy.

13. The system of claim 11, wherein the test policy is based on a predefined consistency parameter provided by a user testing performance of the application.

14. The system of claim 11, wherein:

the second subset includes a respective operation for modifying the respective entity; and in accordance with the test policy, the respective operation is deliberately not applied prior to retrieving the test data from the database.

15. A non-transitory computer readable storage medium storing one or more programs, the one or more programs comprising instructions which, when executed by a computer system with one or more processors, cause the computer system to:

obtain a test policy that specifies a predetermined degree of deliberate inconsistency between write operations and subsequent read operations on a set of data;

receive a request to provide test data to an application; and in response to the request to provide test data to the application, perform a sequence of operations that:

access a transaction log that includes operations waiting to be performed on a database, wherein the database includes a plurality of entities;

select a first subset of operations from the transaction log to perform on the database in accordance with the test policy, wherein a second subset of operations from the transaction log is not included in the first subset of operations;

perform the first subset of operations on the database and exclude the second subset of operations from performance on the database;

retrieve the test data from the database, wherein the test data includes a respective entity that is not consistent with a write operation in the second subset of operations, and;

provide the test data to the application.

16. The non-transitory computer readable storage medium of claim 15, wherein:

the application processes the test data to produce results; and the results are used to determine performance of the application when the application receives input data having the predetermined degree of deliberate inconsistency as specified by the test policy.

17. The non-transitory computer readable storage medium of claim 15, wherein the test policy is based on a predefined consistency parameter provided by a user testing performance of the application.

18. The non-transitory computer readable storage medium of claim 15, wherein:

the second subset includes a respective operation for modifying the respective entity; and in accordance with the test policy, the respective operation is deliberately not applied prior to retrieving the test data from the database.

* * * * *

UNITED STATES PATENT AND TRADEMARK OFFICE
CERTIFICATE OF CORRECTION

PATENT NO. : 9,235,607 B1  
APPLICATION NO. : 13/853985  
DATED : January 12, 2016  
INVENTOR(S) : Ross et al.

Page 1 of 1

It is certified that error appears in the above-identified patent and that said Letters Patent is hereby corrected as shown below:

In the claims, claim 11, col. 23, line 8, please delete "performing sequence" and insert --performing a sequence--.

Signed and Sealed this  
Twelfth Day of April, 2016

Michelle K. Lee  
*Director of the United States Patent and Trademark Office*